United States Patent [19]
Walla et al.

[11] Patent Number: 5,908,528
[45] Date of Patent: Jun. 1, 1999

[54] ELASTOMER COATED LAYER FOR EROSION AND/OR FIRE PROTECTION

[75] Inventors: Lisa A. Walla, Manchester; Charles R. Watson, Windsor, both of Conn.

[73] Assignee: United Technologies Corporation, Hartford, Conn.

[21] Appl. No.: 09/060,750

[22] Filed: Apr. 16, 1998

Related U.S. Application Data

[62] Division of application No. 08/645,669, May 14, 1996, Pat. No. 5,786,285.

[51] Int. Cl.$^6$ .............................. B32B 31/26; B32B 35/00
[52] U.S. Cl. ........................ 156/307.1; 264/175; 442/397
[58] Field of Search ........................... 442/397; 264/175; 156/307.1

[56] References Cited

U.S. PATENT DOCUMENTS

| | | | |
|---|---|---|---|
| 3,860,134 | 1/1975 | Kobalter | 239/265.43 |
| 4,301,052 | 11/1981 | Pollman | 260/29.2 TN |
| 4,311,661 | 1/1982 | Palmer | 264/510 |
| 4,455,123 | 6/1984 | Sanders et al. | 416/134 A |
| 4,738,999 | 4/1988 | Blenner et al. | 524/80 |
| 5,218,810 | 6/1993 | Isley, Jr. | 52/725 |

*Primary Examiner*—Jenna Davis
*Attorney, Agent, or Firm*—Bachman & LaPointe, P.C.

[57] ABSTRACT

A method for preparing an uncured supported elastomer material includes the steps of: providing a fibrous reinforcement material; providing a layer of uncured elastomer material substantially adjacent to the fibrous reinforcement material; exposing the layer and the fibrous reinforcement to a temperature below a curing temperature and above a flow point of the uncured elastomer material, and a pressure sufficient that the uncured elastomer material flows into the fibrous reinforcement material, so as to provide an uncured supported elastomer material.

10 Claims, 1 Drawing Sheet

FIG.1
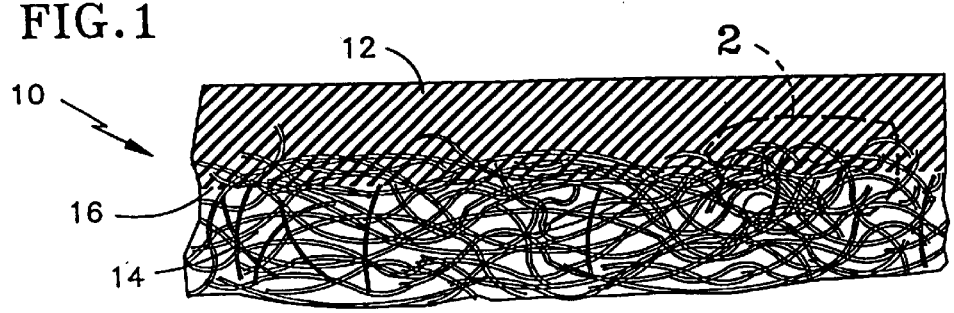
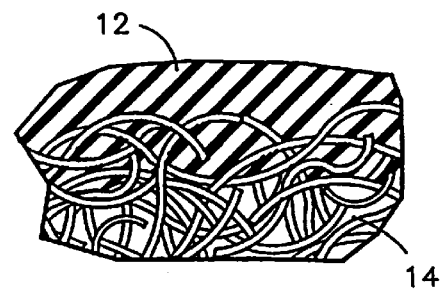
FIG.2
FIG.3
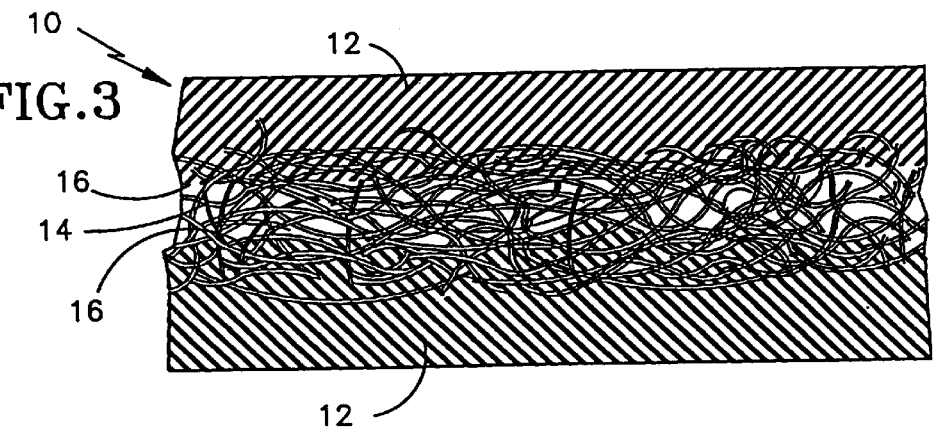
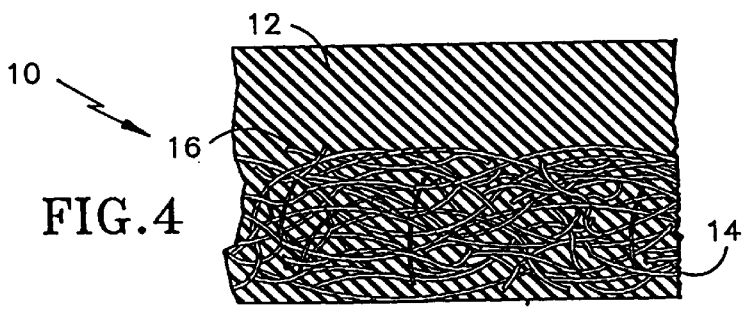
FIG.4

ELASTOMER COATED LAYER FOR EROSION AND/OR FIRE PROTECTION

This is a Division of application Ser. No. 08/645,669, filed May 14, 1996, now U.S. Pat. No. 5,786,285.

BACKGROUND OF THE INVENTION

The invention relates to a supported elastomer material for use in providing structures with enhanced erosion and/or fire resistance, to a method for preparing such uncured supported elastomer materials, and to a method for reinforcing a structure with such a material. The present invention has particular utility in reinforcing various aerospace components and the like, especially those having complex surfaces.

Composite and metallic aerospace components such as helicopter rotors, propellers, gas turbine engine fan blades, compressor airfoils, fan exit guide vanes, struts, nacelle gas path components and the like are expected to operate under a wide variety of environmental conditions. Typically, these components are exposed to impingement from high relative velocity particulate matter which causes the components to deteriorate. Further, extreme temperatures are frequently encountered.

Elastomer materials such as Viton™ have been studied and have been shown to provide effective erosion protection for composites or metals. Sheets of elastomer such as Viton have been used by directly applying this sheet to simple surfaces such as nosecone caps for gas turbine engines to provide effective erosion protection to same. The use of elastomer sheet in these instances is successful because the surface geometry of the component is very gentle, and an elastomer sheet can therefore be applied without significant wrinkling problems.

However, numerous components require enhanced erosion protection wherein the components do not have simple or gentle surface geometry. Examples of such components include helicopter rotors, propellers, gas turbine engine fan blades, compressor airfoils, fan exit guide vanes, struts, nacelle gas path components and the like. A recurring problem encountered during the application of sheets of elastomer to complex surfaces is the formation of wrinkles in the elastomer sheet material. Another problem frequently encountered during the application of elastomer sheet to complex surfaces are deep impressions caused for example by underlying carbon fabric ply. Such wrinkling and impressions lead to relatively large numbers of unacceptable parts, thereby increasing the overall cost of successfully fabricating reinforced aerospace components having complex surfaces. In addition, extreme thickness variations can result in the elastomer layer during fabrication leaving some areas inadequately protected.

It is clear that the need exists for a reinforcement material for use in reinforcing components having complex surfaces which addresses the foregoing problems.

SUMMARY OF THE INVENTION

It is therefore the primary object of the present invention to provide a method for preparing a reinforcement material for providing enhanced resistance to erosion.

It is a further object of the present invention to provide a method for preparing a reinforcement material which is readily applicable to complex surfaces without wrinkling and impression.

It is still another object of the present invention to provide a method for preparing a reinforcement material.

It is a further object of the present invention to provide a method for reinforcing a component having a complex surface.

Still other objects and advantages of the present invention will become more apparent from the following description and drawings.

The foregoing objects are attained according to the invention by a method for preparing an uncured supported elastomer material, which method comprises the steps of providing a sheet of uncured elastomer material, providing a fibrous reinforcement material substantially adjacent to said sheet of uncured elastomer material, exposing said sheet and said fibrous reinforcement to a temperature below a curing temperature and above a flow point of said sheet of uncured elastomer material, and a pressure sufficient that said uncured elastomer material flows into said fibrous reinforcement material, so as to provide said uncured supported elastomer material.

In further accordance with the invention, a composite erosion resistant material is provided which comprises a fibrous reinforcement layer and a sheet of uncured elastomer material applied to and supported on said fibrous reinforcement material.

Still further in accordance with the invention, a method is provided for reinforcing a part having a complex surface, which method comprises the steps of providing an uncured supported elastomer material comprising a fibrous reinforcement material and a layer of uncured elastomer material supported on and infused into said fibrous reinforcement material, providing a part having a complex surface to be reinforced, applying said uncured supported elastomer material to said complex surface, and curing said uncured supported elastomer material.

Other details and features of the process and material of the present invention are set out in the following description and drawings wherein like reference numerals depict like elements.

BRIEF DESCRIPTION OF THE DRAWINGS

FIG. 1 is a side schematic view of a portion of an erosion resistant material in accordance with the invention;

FIG. 2 is an enlarged portion of the erosion resistant material of FIG. 1;

FIG. 3 is a side schematic view of a portion of an erosion resistant material according to an alternate embodiment of the invention; and FIG. 4 is a side schematic view of a portion of an erosion resistant material according to an alternate embodiment of the invention.

DETAILED DESCRIPTION

The invention relates to an erosion resistant material, a method for preparing an erosion resistant material, and a method for reinforcing a component with an erosion resistant material, wherein the erosion resistant material is particularly effective at enhancing the erosion and/or fire resistance particularly of aerospace components having complex surfaces such as helicopter rotors, propellers, gas turbine engine fan blades, compressor airfoils, fan exit guide vanes, nacelle gas path components and the like, without excessive wrinkling, impressions or thickness variations of the resistant material.

Referring now to the drawings, FIG. 1 schematically illustrates a portion of an erosion resistant material 10 according to the invention. As shown, material 10 includes an elastomer material layer 12 and a substantially fibrous reinforcement material layer 14 combined together so as to provide uncured elastomer material 12 supported on reinforcement material 14.

In accordance with the invention, material 10 can be prepared by providing a quantity of uncured elastomer material, for example in sheet or layer form, and providing a quantity of fibrous reinforcement material, contacting the elastomer material and fibrous reinforcement material, and heating the contacted materials to a temperature above the flow point of the elastomer material and less than the curing temperature of the elastomer material, under a pressure sufficient that the heated uncured elastomer material flows into the fibrous reinforcement material whereby the uncured elastomer material and the fibrous reinforcement material are effectively combined, preferably with the uncured elastomer material at least partially infused into the fibrous reinforcement material.

In accordance with the invention, it is critical to keep the temperature to which the elastomer and fibrous materials are exposed at a level below the curing temperature of the elastomer material. Advantageously, this results in a final erosion resistant material product having an uncured elastomer material layer supported on a fibrous reinforcement layer which can be applied to complex surfaces for reinforcement of same wherein the erosion resistant material is less subject to undesirable wrinkling, impressions and the like.

In accordance with the invention, suitable uncured elastomer material may be selected from the group consisting of fluoroelastomers such as, for example, Viton™ or Fluorel™; perfluoroelastomers such as Kalrez™; fluorosilicones such as AMS 7273; silicones and polyurethanes. A particularly preferred elastomer is Viton™ fluoroelastomer which has been found to provide excellent erosion and fire resistance.

In accordance with the invention, elastomer material for use in preparation of the erosion resistant material of the present invention may be provided through a number of different procedures. For example, elastomer material may be provided in layer form by calendaring from an elastomer gum-stock, elastomer material may be provided as an elastomer sheet of the proper desired size, or elastomer material may suitably be provided through spray coating or solution coating directly upon the reinforcement material. Calendaring of elastomer may preferably be performed directly onto a fibrous reinforcement material in accordance with the invention. Each of the foregoing methods of providing the desired elastomer material may suitably be used in accordance with the invention depending upon the particulars of the reinforcement preparation and application procedures. Of course, other methods of providing suitable layers or sheets of elastomer material may be used in accordance with the invention.

Suitable reinforcement materials in accordance with the invention include continuous or discontinuous fibers or fabric of carbon, glass, alumina borosilicate such as Nextel™, nylon, metallic wire, metallic particulate, aramid fiber or fabric such as Kevlar™, polybenzoxazole, polyester, Nicalon™ and graphite.

As set forth above, one form of the erosion resistant material of the present invention is prepared by applying the uncured elastomer material to the fibrous reinforcement material at sufficient temperature and/or pressure that the uncured elastomer material remains uncured, but softens to the point where the elastomer material can flow, and the pressure is preferably sufficient during this treatment to drive flow of uncured elastomer material into the fibrous reinforcement material so as to advantageously result in infusion of the elastomer material into the fibrous reinforcement so as to provide a firm support of elastomer material on the fibrous reinforcement. In accordance with the invention, the treatment temperature is preferably between about 75° F. to about 500° F. When the elastomer material is Viton, a temperature of about 200° F. has been found to be particularly well suited to inducing flow of the Viton fluoroelastomer material without curing same. The treatment pressure sufficient to induce suitable flow and bonding is preferably between about 0 to about 1,000 psi. When the elastomer material is Viton™ fluoroelastomer, and the temperature is about 200° F., a treatment pressure of about 45 psi has been found to be particularly suitable.

Referring to FIG. 2, the treatment processes of the present invention advantageously result in flow or infusion of softened elastomer material 12 across the original material interface 16 between elastomer material layer 12 and fibrous reinforcement material layer 14, so as to provide elastomer material 12 between and encompassing fibers of fibrous reinforcement material 14 thereby providing an effective intimate contact between the fibrous reinforcement material 14 and the uncured elastomer material 12 supported thereon.

In further accordance with the invention, the thickness of sheets or layers of elastomer material 12 and reinforcement material 14 may suitably be selected to provide the desired resistance and protection depending upon the conditions to which erosion resistant material 10 is to be exposed. Typically, however, a sheet or layer of uncured elastomer material 12 preferably has a thickness of between about 0.005 inches to about 0.050 inches, while the reinforcement material may be provided as a sheet of material having a thickness of between about 0.002 inches to about 0.040 inches.

It should be noted that erosion resistant material 10 in accordance with the invention may suitably be provided with an elastomer material layer 12 on either or both sides of fibrous reinforcement material 14. FIGS. 1 and 2 illustrate fibrous reinforcement material 14 having a layer of elastomer material 12 on one side only. In this embodiment, the erosion resistant material 10 according to the invention would be applied to the part to be reinforced with elastomer material layer 12 facing outwardly away from the part.

FIG. 3 illustrates a resistant material 10 according to the invention having elastomer material 12 supported on both sides of fibrous reinforcement material 14. In this embodiment, elastomer material 12 may serve to enhance bonding of erosion resistant material 10 to the part to be reinforced, and may also serve to provide additional dampening of the impact of particulate matter and other erosion causing forces upon erosion resistant material 10 and the underlying component to be protected.

Referring now to FIG. 4, in accordance with an alternative embodiment of the invention, pressure and temperature may be applied to elastomer material 12 and reinforcement material 14 so as to completely infuse elastomer material 12 into reinforcement material 14 as shown. This may be desirable in accordance with the invention so as to further enhance the support of elastomer material 12 on reinforcement material 14, and further so that elastomer material 12 is exposed at a bottom surface 18 of erosion resistant material 10 so as to enhance the bonding of resistant material 10 to a component as desired.

As set forth above, the erosion resistant material 10 of the present invention is particularly well suited to application to components having a complex surface. In accordance with the invention, erosion resistant material 10 may suitably be applied to a complex surface, with or without adhesive, and may then be cured, after application, so as to provide the complex surface with a reinforcement layer of erosion resistant material 10 according to the invention wherein problems such as wrinkling and impressions are greatly reduced or eliminated.

In accordance with the invention, erosion resistant material 10 may be applied to complex surfaces of parts to be reinforced through a number of different methods including but not limited to resin transfer molding (RTM), compression molding, adhesive or other bonding, autoclave bonding and the like. Depending upon the application process to be used, curing of the uncured elastomer material may be accomplished during and/or after the bonding step.

EXAMPLE 1

This example illustrates the advantages of preparation of the uncured supported elastomer material in accordance with the present invention. In this example, various samples of uncured Viton sheet having a thickness of 0.010 inches are applied to a 0.004 inch 120 style woven fiberglass fabric. In an air circulation oven having a cycle of 15 minutes, the temperature was set to 200° F. at atmospheric pressure. A sample of Viton sheet was contacted with a sample of the woven fiberglass fabric, and placed in the air circulation oven. The result was a softening of the still uncured Viton material, but without bonding or adhesion of the Viton to the fiberglass fabric.

A second sample was prepared identical to the first sample and placed in an autoclave under a nylon vacuum bag at 200° F. under a pressure of 45 psi for 15 minutes. This time, the Viton layer softened and flowed very well into the fabric, resulting in a composite material having the uncured Viton material supported on the fiberglass fabric.

Additional samples were prepared wherein Viton was successfully applied to other reinforcement materials including nylon fabric, carbon uniweave fabric, carbon plain weave fabric and fiberglass scrim.

EXAMPLE 2

In this example, an erosion resistant material in accordance with the present invention was successfully applied to a test panel. An uncured supported Viton supported on fiberglass as prepared in Example 1 was applied on one side of a test panel comprising a stack of ten 6 inch squares of carbon/epoxy prepreg, and the stack was placed on a caul plate. The uncured supported Viton was applied to the test panel with the Viton layer facing the outside. The panel with Viton was bagged and cured in an autoclave according to existing 350° F. cure parameters. After the cure, the panel was cut for microstructural evaluation. The bond lines between the carbon and glass, and glass and Viton, were examined and no anomalies were observed. Further, a standard test was performed to evaluate peel strength as between the supported Viton and underlying test panel. The peel strength exhibited was adequate and equivalent to similar tests using unsupported Viton sheet. The uncured supported Viton according to the invention was also tested for erosion protection and was found to provide equivalent protection as compared to unsupported Viton.

EXAMPLE 3

This example illustrates the advantages of supported uncured elastomer in accordance with the invention for reinforcement of components having complex surfaces as compared to unsupported elastomer sheet material. The component to be reinforced was a composite fan exit case consisting of an inner ring, an outer ring, and ten 4-strut packs or 4-packs. The 4-packs are fabricated using resin transfer molding. These struts are vulnerable to erosion and erosion protection for the struts is therefore desirable. Sheets of unsupported uncured Viton were attempted to be applied to the 4-packs, but problems were encountered including extreme wrinkling and deep impressions from the underlying carbon fabric ply. These defects in actual production would result in rejection of the parts.

An erosion resistant material in accordance with the invention was then prepared, consisting of uncured Viton sheet supported on 0.004 inch 108 style fiberglass. The application of this material to the 4-packs resulted in significantly diminished wrinkling and no impressions. Thus, the erosion resistant material of the present invention exhibits advantageous characteristics especially for application to parts having complex surfaces.

It is apparent that there has been provided in accordance with the invention an erosion resistant material and method for preparing such an erosion resistant material which fully satisfies the objects, means and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

What is claimed is:

1. A method for reinforcing a part having a complex surface, comprising the steps of:

providing an uncured supported elastomer material comprising a fibrous reinforcement material and a layer of uncured elastomer material supported on and infused into said fibrous reinforcement material so as to provide an uncured supported elastomer material between and encompassing said fibrous reinforcement material thereby providing an effective intimate contact between the fibrous reinforcement material and the uncured elastomeric material supported thereon;

providing a part having a complex surface to be reinforced;

applying said uncured supported elastomer material to said complex surface; and curing said uncured supported elastomer material.

2. A method according to claim 1, wherein said step of providing said uncured supported elastomer material comprises the steps of:

providing a fibrous reinforcement material;

providing a sheet of uncured elastomer material substantially adjacent to said fibrous reinforcement material;

exposing said layer and said fibrous reinforcement to a temperature below a curing temperature and above a flow point of said uncured elastomer material, and a pressure sufficient that said uncured elastomer material flows into said fibrous reinforcement material, so as to provide said uncured supported elastomer material.

3. A method according to claim 1, wherein said applying step comprises the step of adhesively applying said uncured supported elastomer material to said complex surface using a method selected from the group consisting of resin transfer molding, compression molding, bonding, autoclave bonding and combinations thereof.

4. A method according to claim 1, wherein said part is a helicopter rotor having a complex surface.

5. A method according to claim 1, wherein said part is a propeller having a complex surface.

6. A method according to claim 1, wherein said part is a gas turbine engine fan blade having a complex surface.

7. A method according to claim 1, wherein said part is a nacelle gas path component having a complex surface.

8. A method according to claim 1, wherein said part is a compressor airfoil having a complex surface.

9. A method according to claim 1, wherein said part is a gas path vane having a complex surface.

10. A method according to claim 1, wherein said part is a strut having a complex surface.

\* \* \* \* \*